United States Patent
Yamamichi

(10) Patent No.: US 8,184,321 B2
(45) Date of Patent: May 22, 2012

(54) INFORMATION PROCESSING APPARATUS WITH PRINT FUNCTION GROUPINGS, CONTROL METHOD THEREFOR, AND COMPUTER PROGRAM

(75) Inventor: Masaki Yamamichi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1084 days.

(21) Appl. No.: 12/062,473

(22) Filed: Apr. 3, 2008

(65) Prior Publication Data

US 2008/0246992 A1   Oct. 9, 2008

(30) Foreign Application Priority Data

Apr. 4, 2007   (JP) .................................. 2007-098682

(51) Int. Cl.
*G06F 3/12*   (2006.01)
(52) U.S. Cl. ........................... 358/1.15; 358/1.1; 358/1.9
(58) Field of Classification Search .................... 358/1.1, 358/1.9, 1.15, 400, 401, 448, 468
See application file for complete search history.

(56) References Cited

U.S. PATENT DOCUMENTS

| | | | | |
|---|---|---|---|---|
| 5,715,070 A | * | 2/1998 | Tone et al. | 358/468 |
| 5,742,406 A | * | 4/1998 | Suzuki | 358/468 |
| 2004/0216144 A1 | * | 10/2004 | Mitsui | 719/321 |

FOREIGN PATENT DOCUMENTS

| | | |
|---|---|---|
| JP | 11-85422 A | 3/1999 |
| JP | 2002-215353 A | 8/2002 |
| JP | 2006-48537 A | 2/2006 |

* cited by examiner

*Primary Examiner* — Thomas D Lee
(74) *Attorney, Agent, or Firm* — Rossi, Kimms & McDowell LLP

(57) ABSTRACT

Print settings for input data for printing are acquired. A function group is created for each group of functions, between which contradiction due to change of an execution sequence does not arise, of functions executable in a printer. For each created function group, an execution sequence of functions belonging to the function group is set. Processes for functions designated by the acquired print settings are applied to the data for printing in accordance with the execution sequence set for each function group. Print data created by applying the processes are output to the printer.

8 Claims, 16 Drawing Sheets

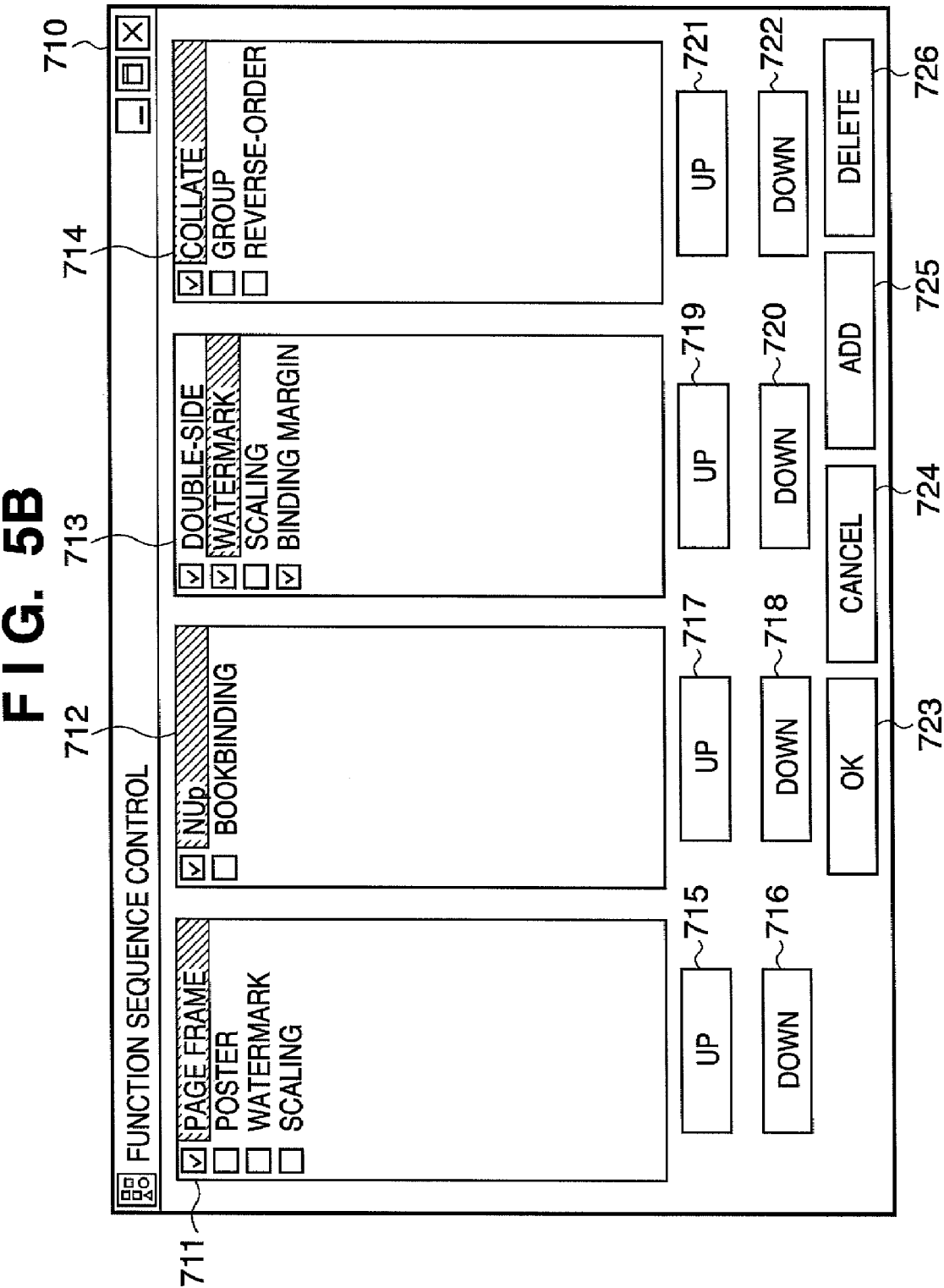

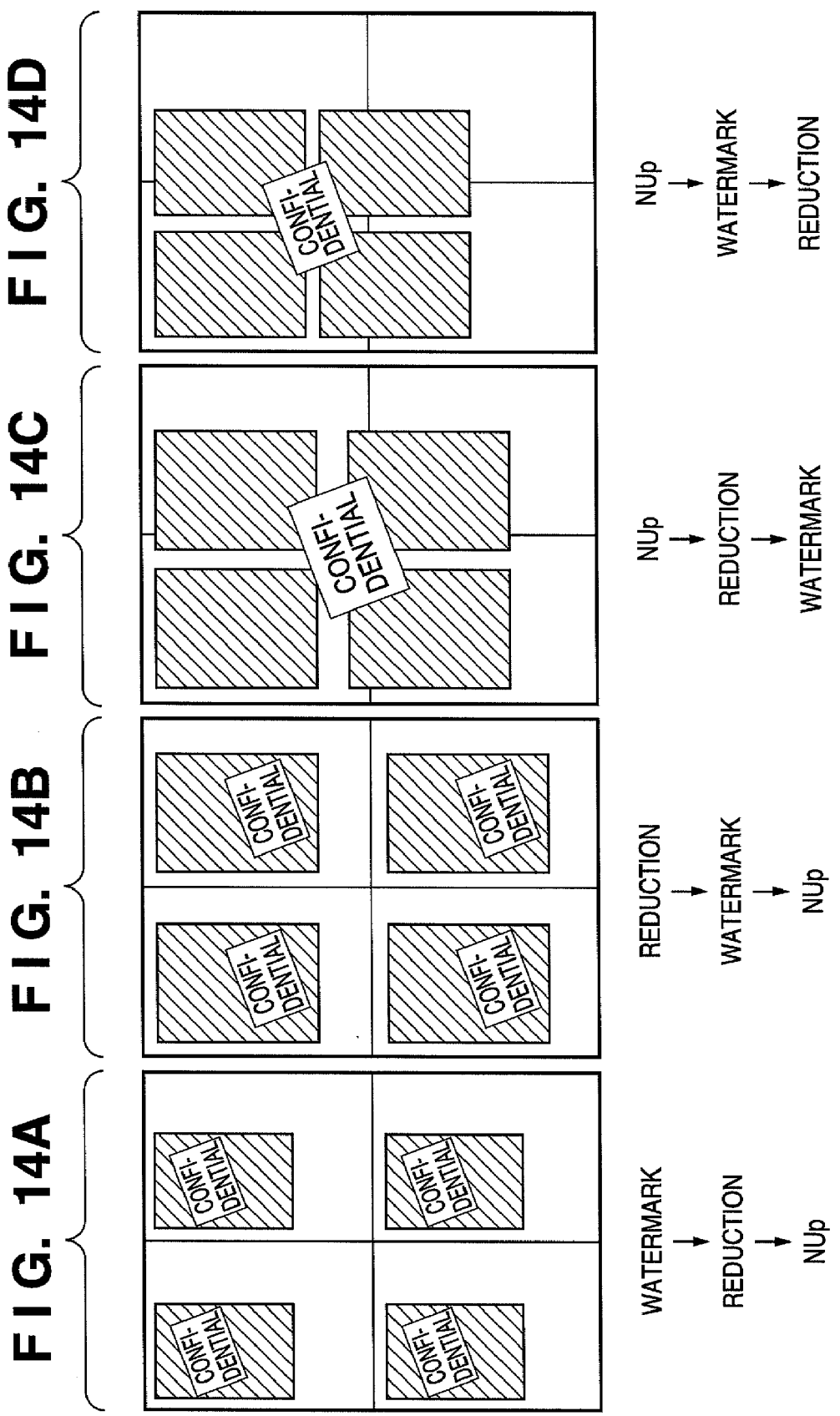

INFORMATION PROCESSING APPARATUS WITH PRINT FUNCTION GROUPINGS, CONTROL METHOD THEREFOR, AND COMPUTER PROGRAM

BACKGROUND OF THE INVENTION

1. Field of the Invention

The present invention relates to an information processing apparatus which generates print data to be output to a printer, a control method therefor, and a computer program.

2. Description of the Related Art

Conventionally, to cause a printer connected to a host computer to print, a user executing printing performs print setting such as setting of a print processing method using a user interface of a printer driver installed in the host computer. This print setting may specify processing designated to be executed for print data.

There are a plurality of items for designating processing types. Functions to be implemented may interfere with each other depending on the combination of items to be designated. There exists a technique for selecting items which can be designated and displaying them on a user interface in consideration of the above problem (e.g., Japanese Patent Laid-Open No. 11-85422). There is also provided a technique for checking a set combination of functions and, if a contradiction between the functions arises, changing the combination so as to resolve the contradiction (e.g., Japanese Patent Laid-Open No. 2002-215353). Furthermore, a technique is proposed in which a processing sequence in printing is controlled when a user arbitrarily specifies the sequence of processes designated by a specific set of print settings (e.g., Japanese Patent Laid-Open No. 2006-48537).

In the conventional techniques, however, identical output results are not always obtained when execution sequences are different from each other, even if the combinations of print settings are the same. In this case, when the printer driver uniquely decides the execution sequence, the user may not obtain an intended result. On the other hand, even if the user arbitrarily specifies the execution sequence, a contradiction due to the execution sequence complicates the setting.

SUMMARY OF THE INVENTION

The present invention has been made to solve the above-described problems, and has as its object to provide an information processing apparatus which can output a print result intended by a user without any contradiction, a control method therefor, and a computer program.

According to the first aspect of the present invention, an information processing apparatus which generates print data to be output to a printer, comprises:

acquisition means for acquiring print settings for input data for printing;

creation means for creating a function group for each group of functions, between which contradiction due to change of an execution sequence does not arise, of those executable in the printer;

setting means for setting, for each function group created by the creation means, an execution sequence of a group of functions belonging to the function group;

applying means for applying processes for functions designated by the print settings acquired by the acquisition means to the data for printing in accordance with the execution sequence set for the each function group by the setting means; and output means for outputting, to the printer, print data created by applying the processes by the applying means.

In a preferred embodiment, the apparatus further comprises warning information output means for outputting warning information representing that identical functions are designated between different function groups by the print settings.

In a preferred embodiment, the creation means creates a function group for each group of functions, between which contradiction due to change of an execution sequence does not arise, of those executable in the printer, for each page attribute serving as a processing unit of the data for printing to apply the functions.

In a preferred embodiment, the page attribute is information representing whether the processing unit of the print data is made up from a single page or a plurality of pages.

In a preferred embodiment, the setting means includes:

calculation means for calculating priority for each of the functions on the basis of an arrangement sequence of the group of functions within the function group and the number of functions selected in accordance with the print settings within the function group, and change means for changing the execution sequence on the basis of the priority calculated by the calculation means.

According to the second aspect of the present invention, a control method for an information processing apparatus which generates print data to be output to a printer, comprises the steps of:

acquiring, by acquisition means, print settings for input data for printing;

creating, by creation means, a function group for each group of functions, between which contradiction due to change of an execution sequence does not arise, of those executable in the printer;

setting, by setting means, an execution sequence of a group of functions belonging to the function group on the basis of priority of each of the functions, for each function group created in the creating step;

applying, by applying means, processes for functions designated by the print settings acquired in the acquiring step to the data for printing in accordance with the execution sequence set for the each function group in the setting step; and outputting, to the printer by output means, print data created by applying the processes in the applying step.

According to the third aspect of the present invention, a computer program stored in a computer-readable medium for causing a computer to execute control of an information processing apparatus which generates print data to be output to a printer, causes the computer to execute the steps of:

acquiring, by acquisition means, print settings for input data for printing;

creating, by creation means, a function group for each group of functions, between which contradiction due to change of an execution sequence does not arise, of those executable in the printer;

setting, by setting means, an execution sequence of a group of functions belonging to the function group on the basis of priority of each of the functions, for each function group created in the creating step;

applying, by applying means, processes for functions designated by the print settings acquired in the acquiring step to the data for printing in accordance with the execution sequence set for the each function group in the setting step; and outputting, to the printer by output means, print data created by applying the processes in the applying step.

According to the fourth aspect of the present invention, an information processing apparatus which generates print data to be output to a printer; comprises:

display means for displaying a group of functions belonging to a function group in which functions are classified so that contradiction due to execution of designated functions does not arise;

selection means for selecting functions from the group of functions belonging to the function group displayed by the display means; and creation means for creating print data in accordance with the functions selected by the selection means.

According to the fifth aspect of the present invention, an information processing method of creating print data to be output to a printer, comprises the step of:

displaying, by display means, a group of functions belonging to a function group in which functions are classified so that contradiction due to execution of designated functions does not arise;

selecting, by selection means, functions from the group of functions belonging to the function group displayed in the displaying step; and creating, by creation means, print data in accordance with the functions selected in the selecting step.

According to the sixth aspect of the present invention, a computer program stored in a computer-readable medium, which is executed in a computer for creating print data to be output to a printer, causes the computer to execute the steps of:

displaying, by display means, a group of functions belonging to a function group in which functions are classified so that contradiction due to execution of designated functions does not arise;

selecting, by selection means, functions from the group of functions belonging to the function group displayed in the displaying step; and creating, by creation means, print data in accordance with the functions selected in the selecting step.

Further features of the present invention will become apparent from the following description of exemplary embodiments with reference to the attached drawings.

BRIEF DESCRIPTION OF THE DRAWINGS

FIG. 5B is a view showing an example of a function execution sequence change user interface according to the embodiment of the present invention;

FIGS. 14A to 14D are views showing examples of differences between output results obtained by changing the applying sequence of the functions in executing printing according to the embodiment of the present invention.

DESCRIPTION OF THE EMBODIMENT

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

<Configuration of Print System>

Figure 1:
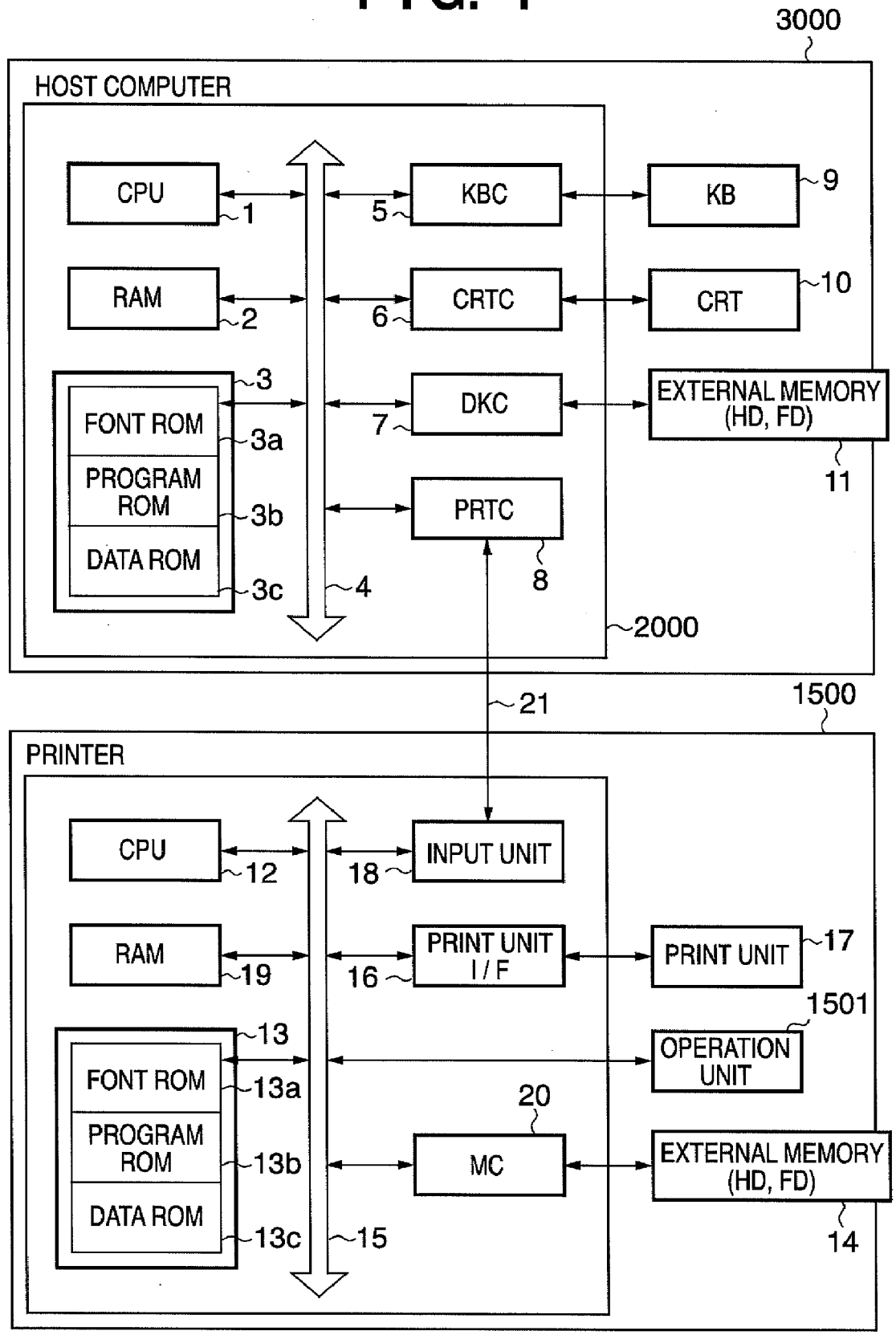
FIG. 1 a block diagram showing the configuration of a print system according to an embodiment of the present invention.

FIG. 1 is a block diagram showing the configuration of a print system according to an embodiment of the present invention.

The present invention is applicable to either a single function or a system consisting of a plurality of apparatuses as far as the functions of the present invention can be executed, unless otherwise specified. The present invention is also applicable to a system which is connected via a network such as a LAN or WAN to perform processes.

Referring to FIG. 1, reference numeral 3000 denotes a host computer (information processing apparatus) having a CPU 1. The CPU 1 processes a document of constituting elements such as a figure, image, text, and table (including a spreadsheet) on the basis of programs including a document processing program (application program) stored in a program ROM 3b of a ROM 3 or an external memory 11. The CPU 1 comprehensively controls each device connected to a system bus 4 in a host computer main body 2000.

The program ROM 3b of the RON 3 or the external memory 11 stores programs such as an operating system program (to be referred to as an OS hereinafter) which is a control program for the CPU 1. A font ROM 3a of the ROM 3 or the external memory 11 stores data such as font data used in the document process. A data ROM 3c of the ROM 3 or the external memory 11 stores various data used to perform various processes such as the document process.

Reference numeral 2 denotes a RAM functioning as a main memory, work area, and the like for the CPU 1. Reference numeral 5 denotes a keyboard controller (KBC) which controls a key input from a keyboard (KB) 9 or a pointing device (not shown). Reference numeral 6 denotes a CRT controller (CRTC) which controls display on a CRT display (CRT) 10. An LCD controller and LCD are also available instead of the CRT controller 6 and CRT display 10.

Reference numeral 7 denotes a disk controller (DKC) which controls access to the external memory 11 for a boot program, various applications, font data, user files, edit files, and the like. The DKC 7 also controls access to the external memory 11 (e.g., a hard disk (HD) or Floppy® disk (FD)) which stores various data such as a print control command generation program (to be referred to as a printer driver hereinafter).

Reference numeral 8 denotes a printer controller (PRTC) which connects to a printer 1500 via a predetermined bidirectional interface 21, and executes a communication control process with the printer 1500. Examples of the bidirectional interface are a USB interface, IEEE1394 interface, and wireless LAN interface.

The CPU 1 enables WYSIWYG on the CRT 10 by rasterizing an outline font in a display information RAM set in, e.g., the RAM 2 to provide a GUI. The CPU 1 opens various registered windows and executes various data processes on the basis of commands designated with the mouse cursor (not shown) or the like on the CRT 10. In printing, the user opens a window associated with print setting, and sets the printer and a printing method to the printer driver including selection of the print mode.

In the printer 1500, reference numeral 12 denotes a printer CPU. The printer CPU 12 comprehensively controls each device connected to a system bus 15 in a printer control unit 1000. The printer CPU 12 outputs an image signal serving as output information to a print unit (printer engine) 17 connected to the system bus 15 on the basis of a program such as a control program stored in a program ROM 13b of a ROM 13 or an external memory 14.

The program ROM 13b of the ROM 13 stores programs such as a control program for the printer CPU 12. A font ROM 13a of the ROM 13 stores data such as font data used to generate the output information. When the printer does not comprise any external memory 14 such as a hard disk (HD) or IC card, a data ROM 13c of the RON 13 stores information or the like used in the host computer 3000.

The printer CPU 12 can communicate with the host computer 3000 via an input unit 18, and can notify the host computer 3000 of various types of information such as status information in the printer 1500. Reference numeral 19 denotes a RAM functioning as a main memory, work area, and the like for the CPU 12. The RAM 19 can increase its memory capacity by an optional RAM connected to an expansion port (not shown). The RAM 19 is used as an output information mapping area, environment data storage area, NVRAM, and the like.

A memory controller (MC) 20 controls access to the external memory 14. The external memory 14 is connected as an option, and stores data such as font data, an emulation program, and form data. Reference numeral 1501 denotes an operation unit having an operation panel, switch, LED display, and the like for various operations to the printer 1500.

The number of external memories 14 is not limited to one, and but is at least one. It is possible to connect a plurality of external memories which store a built-in font, an optional font card, and a program for interpreting printer control languages of different language systems. The external memory 14 may have an NVRAM (not shown) to store printer mode setting information from an operation unit 1501.

In this embodiment, as an example of the print unit 17, a printer engine using an electrophotographic scheme as a printing scheme will be described. Note that a printing scheme in the present invention is not limited to an electrophotographic scheme.

A functional configuration for executing a print process in the print system of FIG. 1 will be described next using FIG. 2.

Figure 2:
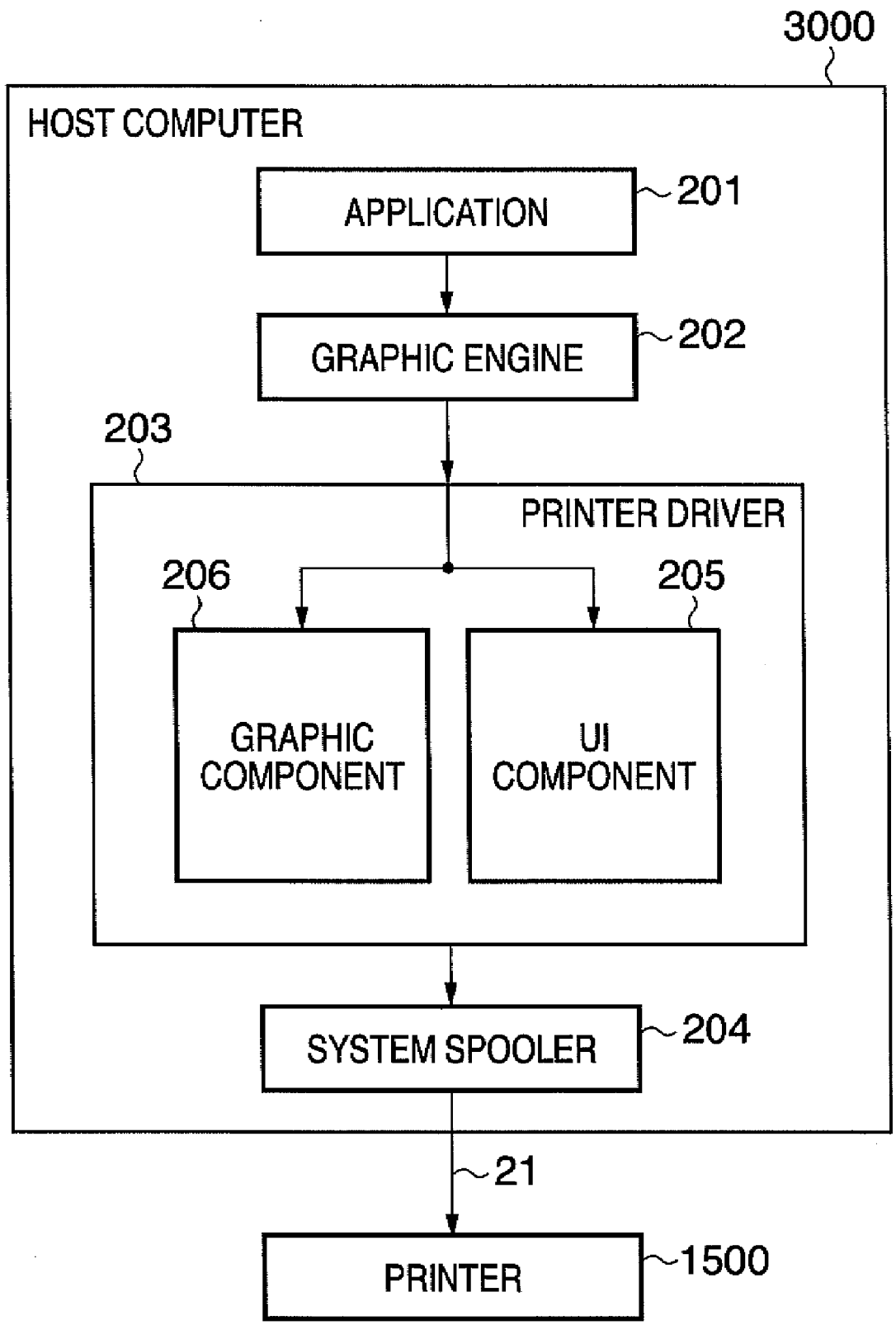
FIG. 2 is a block diagram showing a functional configuration for executing a print process in the print system according to the embodiment of the present invention.

FIG. 2 is a block diagram showing the functional configuration for executing the print process in the print system according to the embodiment of the present invention.

An application 201, graphic engine 202, printer driver 203, and system spooler 204 exist as files saved in the external memory 11 of the host computer 3000. These files are program modules which are loaded to the RAM 2 and executed by the OS that runs on the host computer 3000 or a module that uses the modules.

The application 201 and the printer driver 203 can be added to the external memory 11 via a network (not shown). The application 201 saved in the external memory 11 is loaded to the RAM 2 and executed. However, if the application 201 causes the printer 1500 to print, output (rendering) is done by using the graphic engine 202 which is loaded to the RAM 2 and set in an executable state, like the application 201.

The graphic engine 202 loads the printer driver 203 prepared for each printer 1500 from the external memory 11 to the RAM 2, processes the output of the application 201, and outputs it to the printer driver 203. More specifically, the graphic engine 202 receives the print settings or data for printing from the application 201, and outputs them to the printer driver 203.

A UI (user interface) component 205 of the printer driver 203 receives the print settings from the graphic engine 202, and then, e.g., displays them on the CRT 10 and changes them. If the UI component 205 changes the print settings, the printer driver 203 returns the changed print settings to the application 201 via the graphic engine 202.

A graphic component 206 of the printer driver 203 receives the data for printing from the graphic engine 202, and converts them into a control command, e.g., a printer control command such as a PDL command, recognizable by the printer 1500. The printer control command is output as print data to the printer 1500 via the bidirectional interface 21 through the system spooler 204 loaded to the RAM 2 by the OS.

Note that PDL is an abbreviation for Page Description Language.

<Print Setting Process>

A print setting process according to the present invention will be described next.

First, a data flow associated with the print setting by the print system according to the embodiment of the present invention will be explained using FIG. 3.

Figure 3:
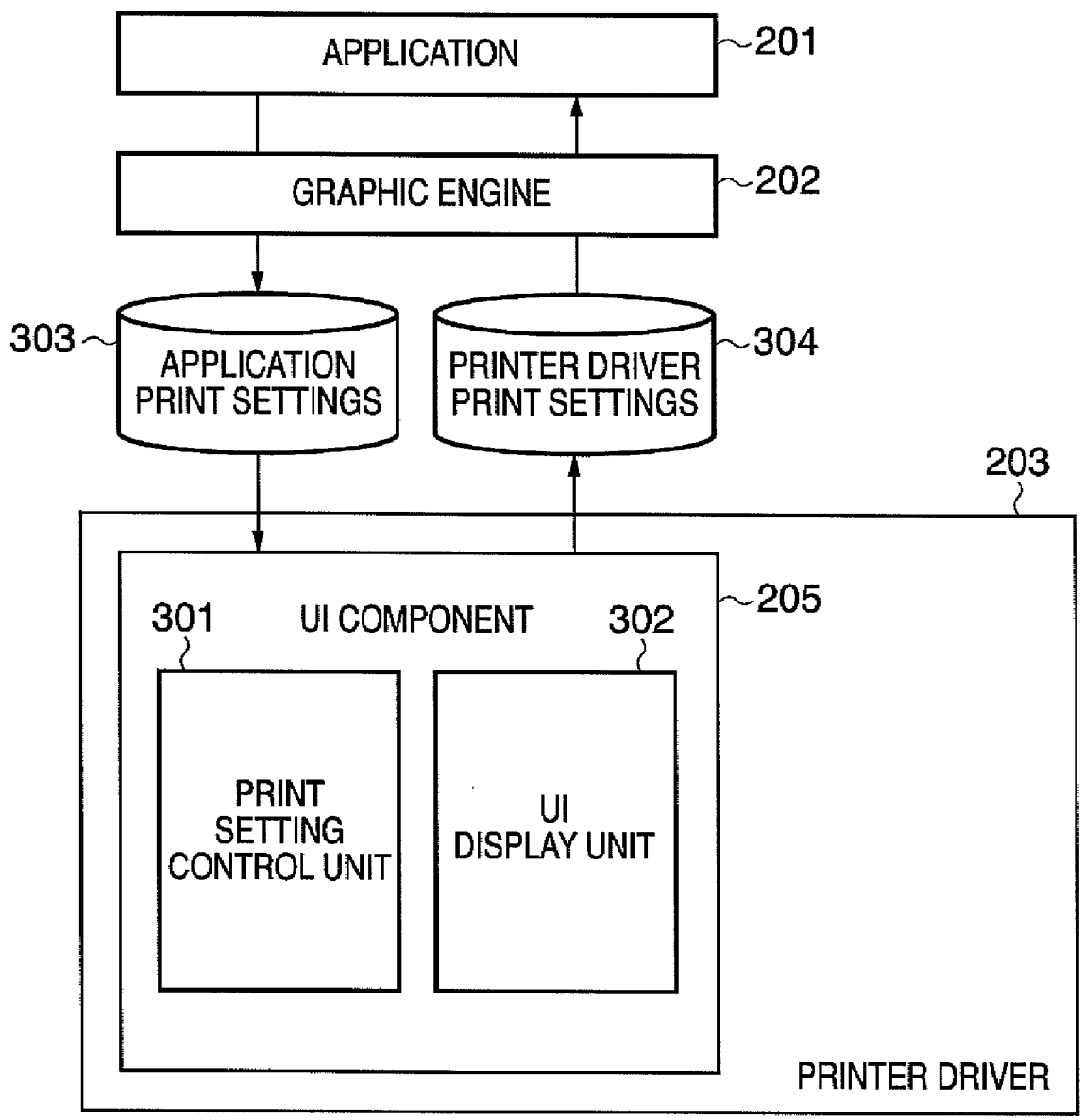
FIG. 3 is a view showing a data flow associated with print setting by the print system according to the embodiment of the present invention.

FIG. 3 is a view showing the data flow associated with the print setting by the print system according to the embodiment of the present invention. FIG. 3 especially shows the detailed configuration of some of the components in FIG. 2, which are associated with the print setting.

Reference numeral 301 denotes a print setting control unit for executing prohibition rule processing associated with the print settings. This prohibition rule processing analyzes whether interference occurs between the print settings, and on the basis of the analysis result, converts the print settings into those in a state in which interference does not occur. Reference numeral 302 denotes a UI display unit for displaying a printer driver user interface on the basis of the print settings processed by the prohibition rule processing.

Reference numeral 303 denotes application print settings set by the application 201; and 304, printer driver print settings set by the printer driver 203. The UI component 205 receives the application print settings 303. After processing the contents of the application print settings 303, the UI component 205 returns them to the application 201 via the graphic engine 202 as the printer driver print settings 304.

The print setting process by the printer driver 203 will be described using FIG. 4.

Figure 4:
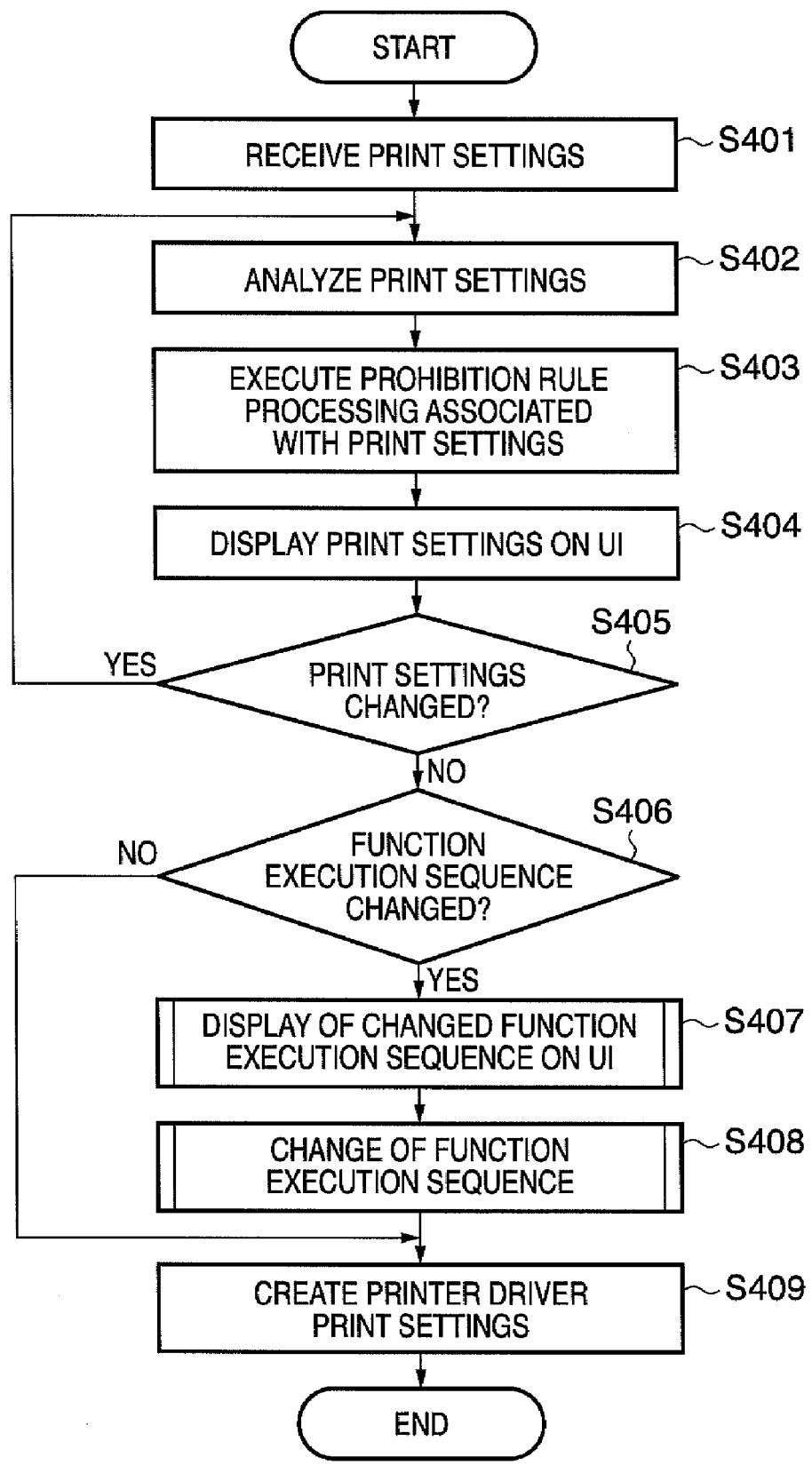
FIG. 4 is a flowchart showing a print setting process by a printer driver according to the embodiment of the present invention.

FIG. 4 is a flowchart showing the print setting process by the printer driver according to the embodiment of the present invention.

In step S401, the UI component 205 receives the application print settings 303. In step S402, the UI component 205 analyzes the received application print settings 303. In step S403, the UI component 205 converts the application print settings 303 into print settings in a state in which interference does not occur, as the prohibition rule processing associated with the application print settings 303. In step S404, the UI component 205 displays a printer driver user interface (UI) having the converted print settings on the CRT 10.

An example of the printer driver user interface will be described using FIG. 5A.

Figure 5A:
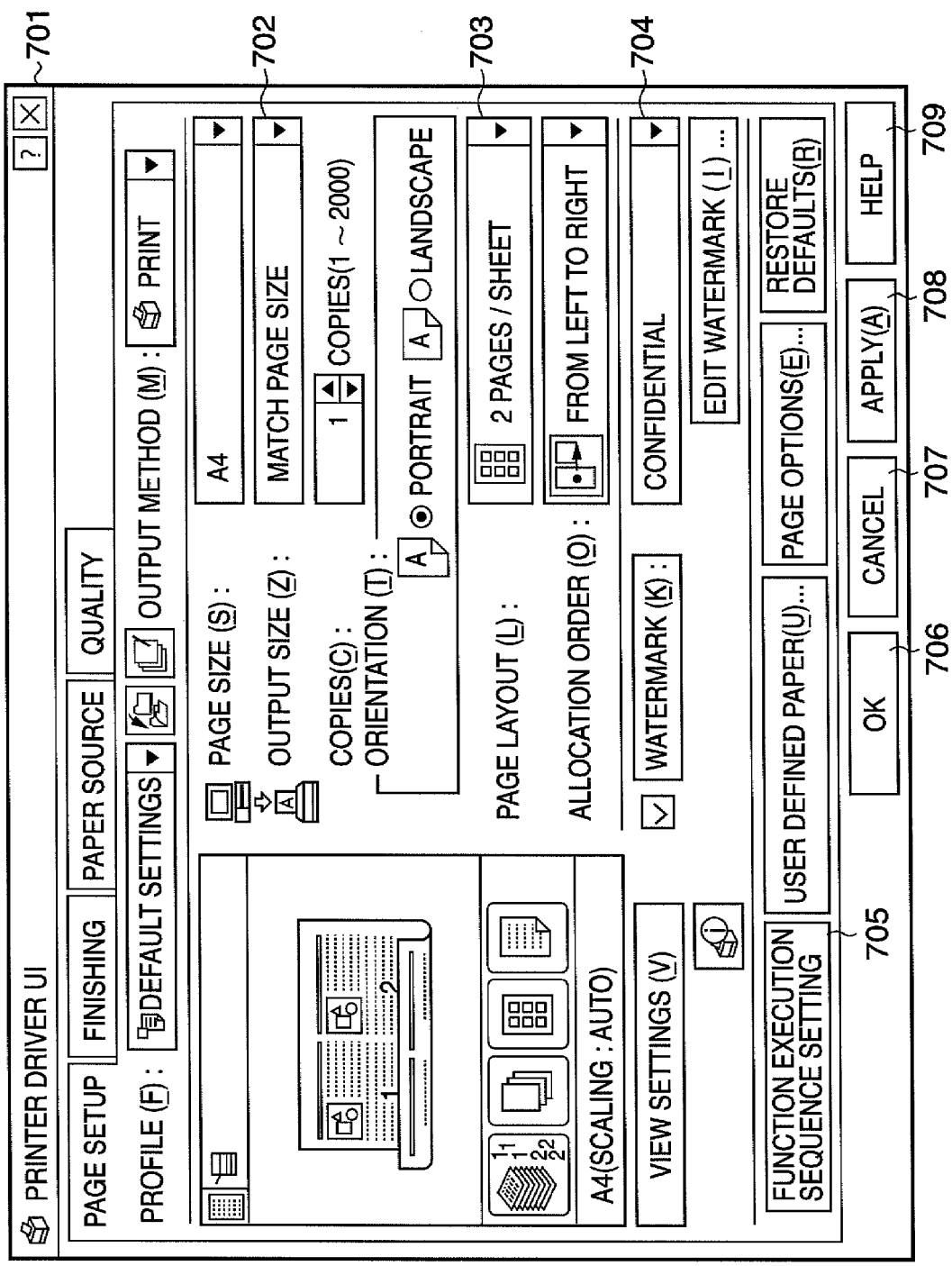
FIG. 5A is a view showing an example of a printer driver user interface according to the embodiment of the present invention.

FIG. 5A is a view showing an example of the printer driver user interface according to the embodiment of the present invention.

A printer driver user interface 701 takes over the application print settings 303, and displays a window having the contents of the application print settings 303 in an initial state. The user can change the contents using the printer driver user interface 701 if necessary.

In the printer driver user interface 701, reference numerals 702 to 704 denote various types of controls for implementing some print settings of print functions held by the printer driver user interface 701. The control 702 serving as a pull-down menu is a control for changing an output paper size. The control 703 is a control for changing a page layout. The control 704 is a control for adding or editing a watermark.

Reference numeral 705 denotes a function execution sequence setting button for displaying a function execution sequence change user interface (FIG. 5B) to control (set) a sequence of the functions to be executed in accordance with the print settings. Details of the function execution sequence change user interface will be described later.

Reference numeral 706 denotes an OK button for confirming the print settings set in the printer driver user interface 701. Upon pressing the OK button 706, the print settings set in the printer driver user interface 701 are stored in the RAM 2 as print setting information and the display of the printer driver user interface 701 ends.

Reference numeral 707 denotes a cancel button for canceling the print settings set in the printer driver user interface 701. Upon pressing the cancel button 707, the print settings set in the printer driver user interface 701 are canceled and the display of the printer driver user interface 701 ends.

Reference numeral 708 denotes an apply button for temporarily confirming the print settings set in the printer driver user interface 701. Upon pressing the apply button 708, the print settings set in the printer driver user interface 701 are temporarily confirmed as print setting information. The display of the printer driver user interface 701, however, does not end so that changes after the confirmation can be accepted.

Reference numeral 709 denotes a help button for displaying a help window associated with various operations such as print setting in the printer driver user interface 701.

The explanation will return to FIG. 4.

In step S405, the UI component 205 determines whether the print settings are changed in the printer driver user interface 701. If the print settings are changed (YES in step S405), the process returns to step S402; otherwise (NO in step S405), the process advances to step S406.

This determination is done by detecting whether change of the print settings is designated by a user operation on various types of controls such as the controls 702 to 704 in the printer driver user interface 701.

In step S406, the UI component 205 determines whether change of the function execution sequence is designated for the functions to be executed in accordance with the print settings. If the change of the function execution sequence is designated (YES in step S406), the process advances to step S407; otherwise (NO in step S406), the process advances to step S409.

With respect to the determination of the function execution sequence change designation, when the function execution sequence setting button 705 of the printer driver user interface 701 is pressed, it is determined that the change of the function execution sequence is designated.

In step S407, the UI component 205 displays a function execution sequence change user interface.

An example of the function execution sequence change user interface will be described using FIG. 5B.

FIG. 5B is a view showing an example of a function execution sequence change user interface according to the embodiment of the present invention.

A function execution sequence change user interface 710 is a user interface for changing the execution sequence of the functions implemented by the printer driver 203 (functions executable by the printer 1500). In particular, the function execution sequence change user interface 710 manages, for each function group, a group of functions, between which interference or contradiction due to the function applying sequence does not occur, of those to be executed in accordance with the print settings set in the printer driver user interface 701.

In the function execution sequence change user interface 710, reference numerals 711 to 714 denote function groups. In each of the function groups 711 to 714, functions (e.g., page frame, and bookbinding functions) belonging to the corresponding function group are displayed in the applying sequence from the top.

Each function of the function groups has a check box for discriminating whether the function is currently set or not. The function whose check box is checked represents a state in which the function is set, while the function whose check box is not checked represents a state in which the function is not set.

In each function group, the function selected as a processing target is displayed in a form discriminable from other functions using, e.g., highlight display.

Change buttons 715 and 716 for changing the applying sequence of the functions belonging to the function group 711 are arranged for the function group 711. The change button 715 is a button for moving the selected function belonging to the function group upward from the current position within the function group. The change button 716 is a button for moving the selected function belonging to the function group downward from the current position within the function group.

Similar to the function group 711, change buttons 717 and 718, 719 and 720, and 721 and 722 are arranged for the function groups 712, 713, and 714, respectively.

Reference numeral 723 denotes an OK button for confirming the setting states of the functions in the function execution sequence change user interface 710. Upon pressing the OK button 723, if the setting states have changed, the changed contents are reflected in the corresponding print settings set in the printer driver user interface 701 and the control returns to the display of the printer driver user interface 701.

Reference numeral 724 denotes a cancel button for canceling the setting states of the functions in the function execution sequence change user interface 710. Upon pressing the cancel button 724, if the setting states are changed, the setting states are canceled and the control returns to the display of the printer driver user interface 701.

Reference numeral 725 denotes an add button for adding new functions to the function groups. Upon pressing the add button 725, a function list window is displayed for selecting and adding desired functions from a group of functions which can be added. Reference numeral 726 denotes a delete button for deleting the selected functions within each function group.

As described above, it is possible to change the setting states of the functions, and to add and delete the functions in the function execution sequence change user interface 710. If the setting states of the functions are changed or the functions are added/deleted by using the add button 725/delete button 726, it is determined in step S405 that the print settings are changed.

In this case, the processes in steps S402 to S404 are thus executed again on the print settings which have been changed. In the process of step S404, it is possible to display only the print settings of the selected functions in the printer driver user interface 701.

Furthermore, it is possible to allow the existence of the same or similar functions such as "watermark" functions within the function groups 711 and 713 in the function execution sequence change user interface 710. If identical functions are selected, caution can be exercised by outputting warning information (a warning window) (warning information output) representing that the identical functions are selected.

An example of the warning window will be described using FIG. 5C.

Figure 5C:
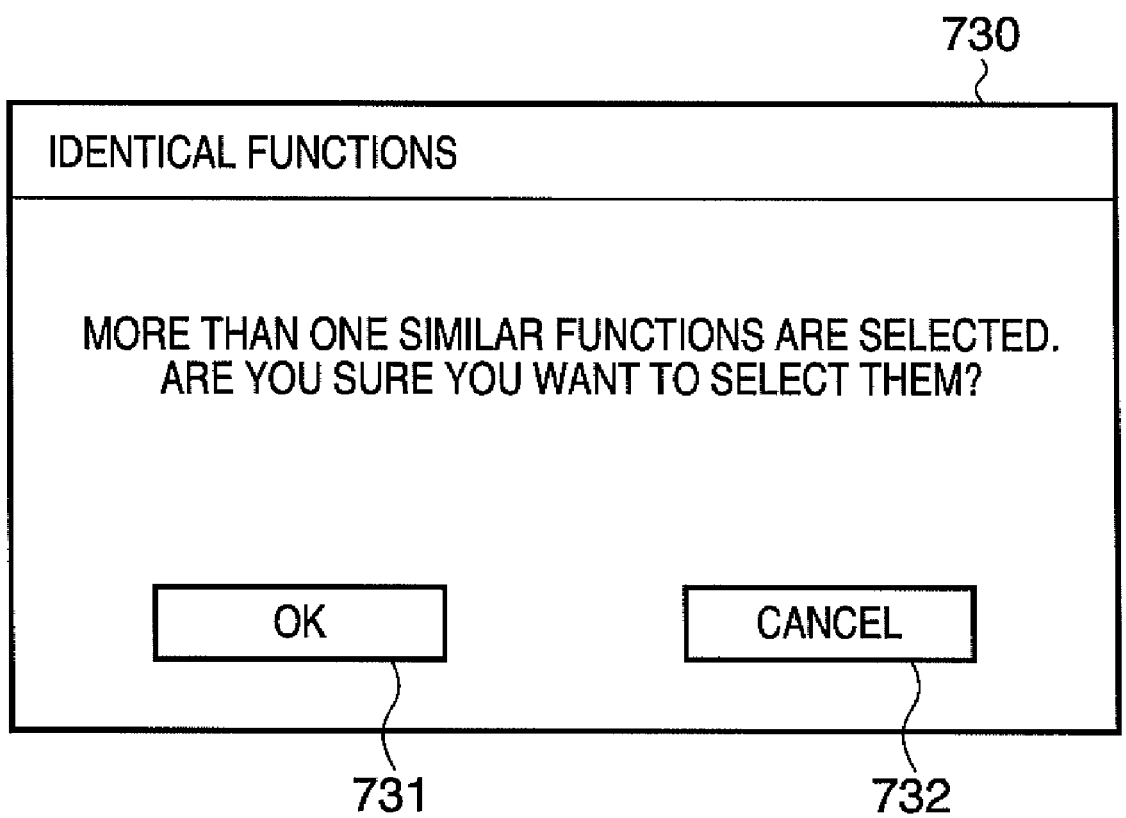
FIG. 5C is a view showing an example of a warning window according to the embodiment of the present invention.

FIG. 5C is a view showing an example of a warning window according to the embodiment of the present invention.

A warning window 730 indicates that identical functions between different function groups are selected in the function execution sequence change user interface 710.

In the warning window 730, reference numeral 731 denotes an OK button. Upon pressing the OK button 731, the existence of the identical functions between the different function groups is settled. Reference numeral 732 denotes a cancel button. Upon pressing the cancel button 732, one of the identical functions remains selected and the remaining functions are deleted. Alternatively, if the identical functions between the different function groups are selected, it is also possible to leave one of the functions selected and delete the remaining functions without outputting the warning window. The deletion target functions are selected on the basis of, e.g., priority codes (priorities) calculated for the function groups.

The explanation will return to FIG. 4.

In step S408, the UI component 205 changes the function execution sequence on the basis of the operation on the function execution sequence change user interface 710. In this process, the UI component 205 calculates a priority code representing the execution priority of each function of each function group in the function execution sequence change user interface 710 on the basis of the arrangement order of functions within the corresponding function group and the number of selected functions. According to the calculated priority codes, the function execution sequence of the functions to be applied is set (changed). Details of this process will be described later.

In step S409, the UI component 205 changes the current print settings on the basis of the set function execution sequence, and creates the printer driver print settings 304 from the changed print settings.

Details of the process in step S407 will be described next using FIG. 6.

Figure 6:
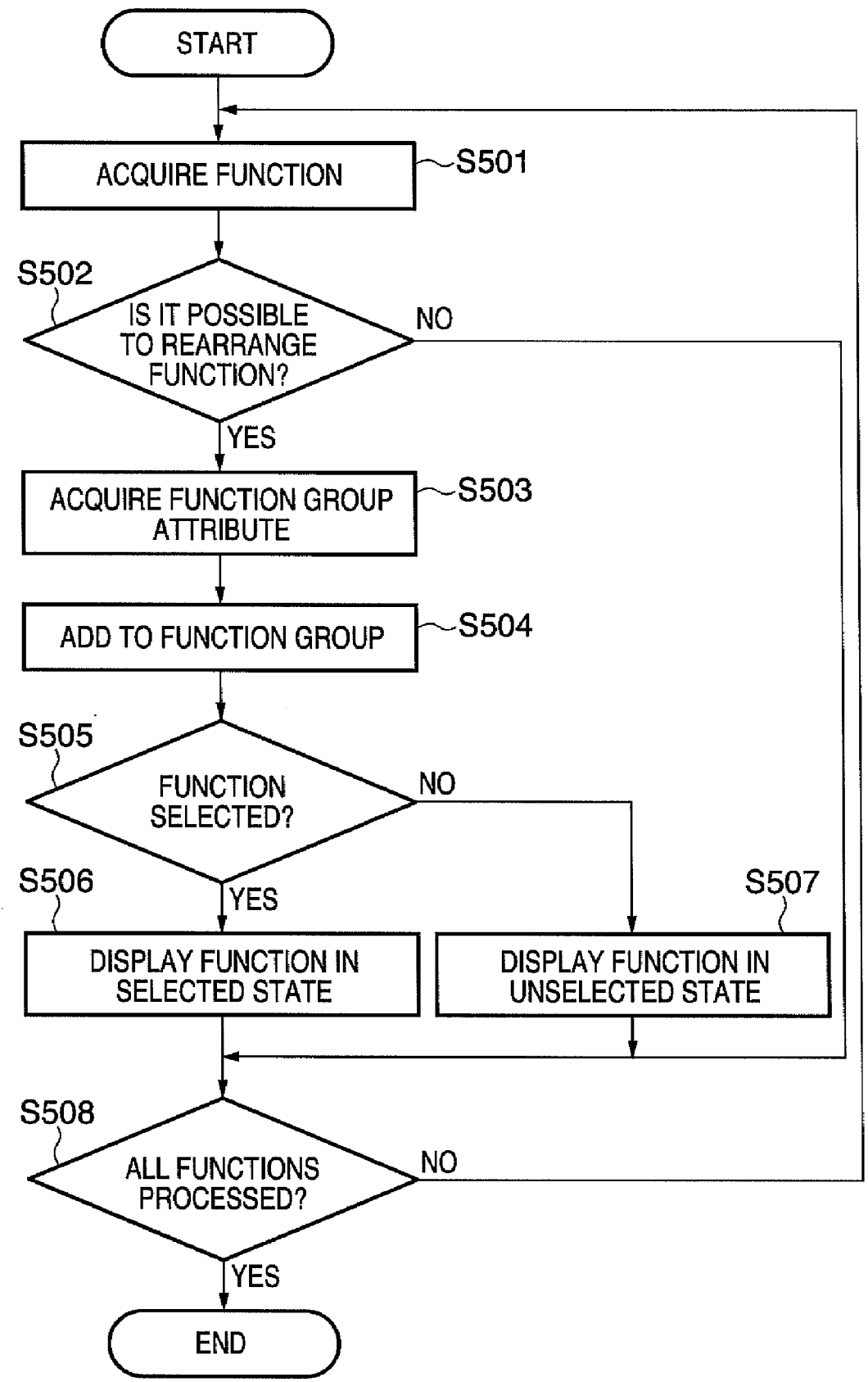
FIG. 6 is a flowchart showing details of a process in step S407 according to the embodiment of the present invention.

FIG. 6 is a flowchart showing the details of the process in step S407 according to the embodiment of the present invention.

In step S501, a function is acquired from the received print settings. It is determined in step S502 whether it is possible to rearrange the acquired function. If it is possible to rearrange the function (YES in step S502), the process advances to step S503; otherwise (NO in step S502), the process advances to step S508.

A function group attribute representing a function group to which the acquired function belongs, and a priority code corresponding to the function are acquired in step S503. Information representing whether it is possible to rearrange the processing target function, and information pertaining to the function group attribute and priority code may be held in the UI component 205 in advance or may be provided as an external file.

In step S504, the acquired function is added to a function group in accordance with the function group attribute.

It is determined in step S505 whether the acquired function is currently selected in the printer driver user interface 701. If the acquired function is currently selected (YES in step S505), the process advances to step S506. In step S506, the function is displayed in the selected state on the function execution sequence change user interface 710. In the example of FIG. 5B, the function is displayed in the selected state by checking the check box corresponding to the function.

If the acquired function is not currently selected (NO in step S505), the process advances to step S507. In step S507, the function is displayed in the unselected state on the function execution sequence change user interface 710. In the example of FIG. 5B, the function is displayed in the unselected state by not checking the check box corresponding to the function.

It is determined in step S508 whether the process is complete for all the functions acquired from the print settings. If the process is not complete (NO in step S508), the process returns to step S501; otherwise (YES in step S508), the process ends.

Details of the process in step S408 will be described next using FIG. 7.

Figure 7:
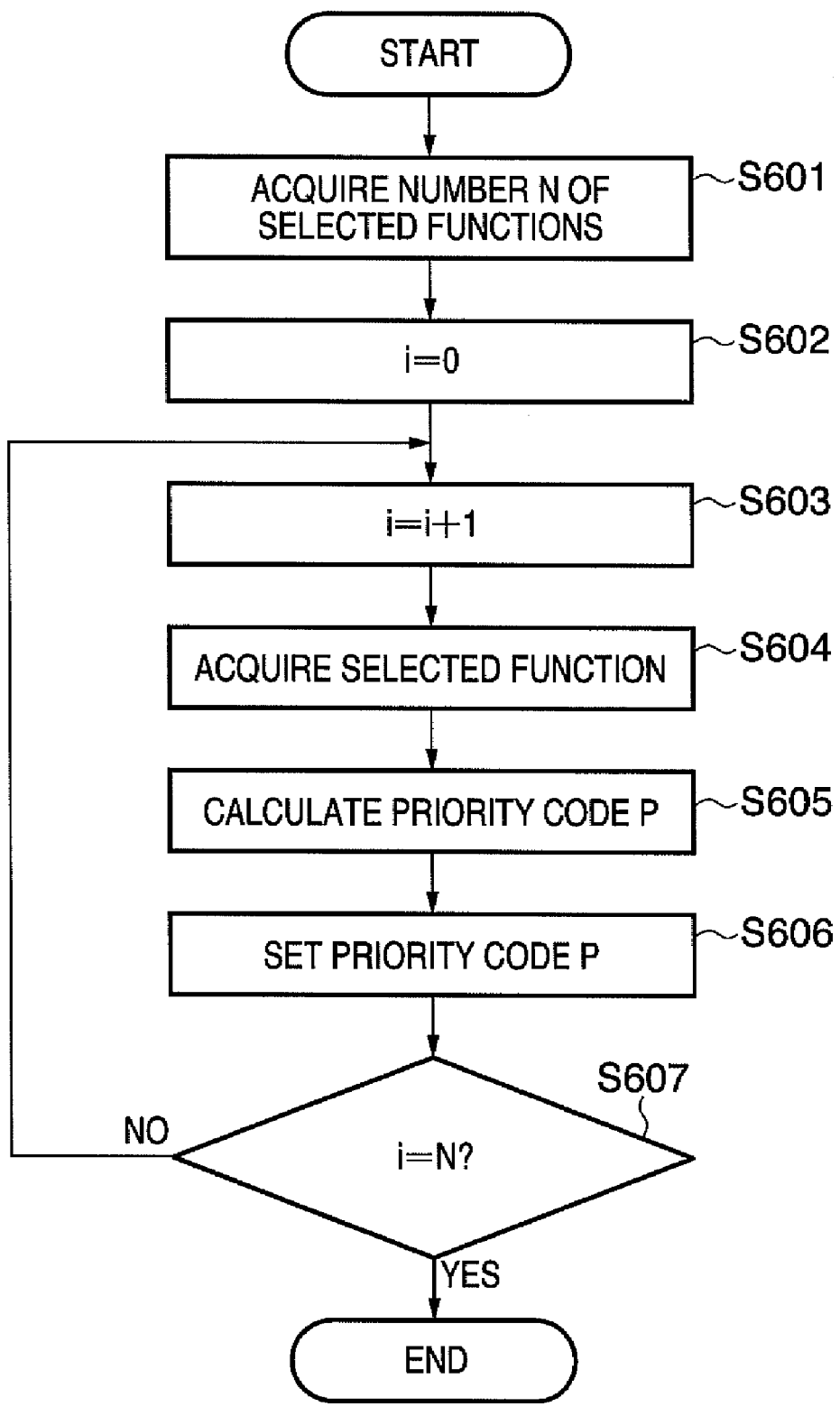
FIG. 7 is a flowchart showing details of a process in step S408 according to the embodiment of the present invention.

FIG. 7 is a flowchart showing the details of the process in step S408 according to the embodiment of the present invention. This flowchart is associated with setting of priority codes in the function applying sequence change process.

The process calculates the priority code of each function for each function group upon pressing the OK button 723 in the function execution sequence change user interface 710 of FIG. 5B.

The number N of functions which have been selected in a target function group is acquired in step S601. A function index value i for counting the number of functions which have been processed is set to 0 in step S602. In step S603, i is incremented by one. The functions, which have been checked (selected), of those displayed within the target function group in the function execution sequence change user interface 710 are acquired one by one from the top in step S604. In step 605, a priority code P of the acquired function is calculated. An example of the calculation method is as follows.

$$P = i \times (1/N)$$

The priority code P obtained as the calculation result has a value between 0 to 1. The calculated priority code P is set to the acquired function.

It is determined in the step S607 whether i=N, i.e., whether the priority codes of all the functions selected in the target function group are calculated. If i≠N (NO in step S607), the process returns to step S603; otherwise (YES in step S607), the process ends.

The calculation process of the priority codes is executed for each function group. With this process, it is possible to acquire function information on each function.

An example of the function information will be described next using FIG. 8.

Figure 8:
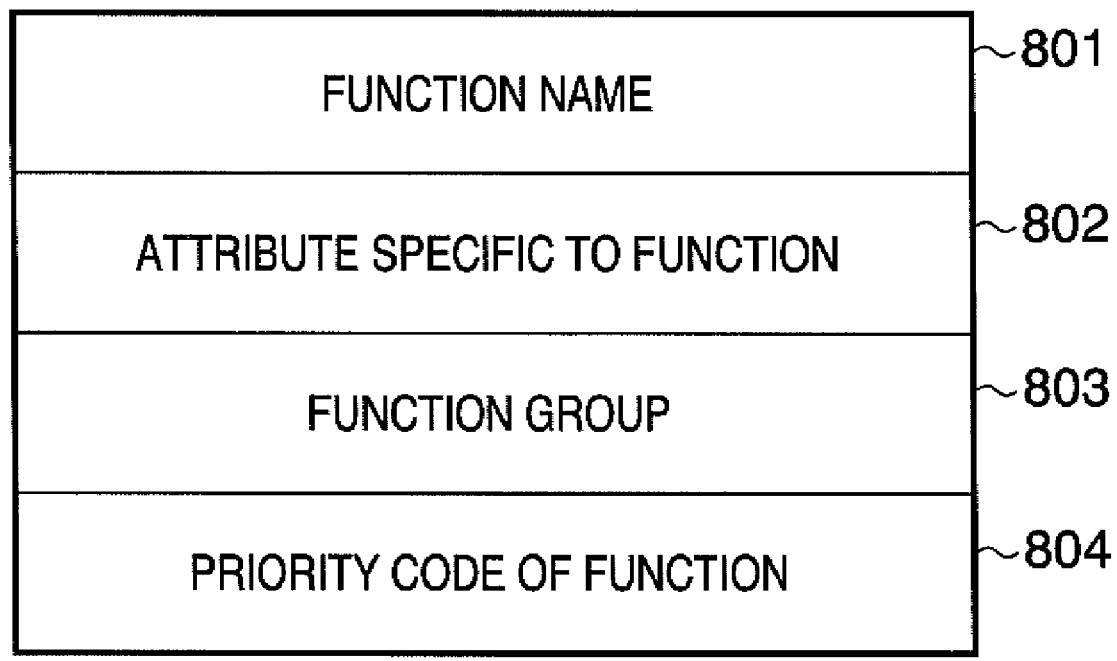
FIG. 8 is a view showing an example of function information on a function according to the embodiment of the present invention.

FIG. 8 is a view showing an example of function information on a function according to the embodiment of the present invention.

The function information shown in FIG. 8 is an example of information held by each function in the print settings created by the UI component 205 of the printer driver 203. The function information may be in a text form such as an XML form or may exist as binary data. This function information may be held by the printer driver 203 or may exist as an external file.

Reference numeral 801 denotes an attribute for specifying a function itself, which includes information such as a name or ID. Reference numeral 802 denotes information representing an attribute specific to the function. If, for example, the function is a page layout function, N in the function (N in 1 or NUp) of laying out and printing N pages on one sheet corresponds to the attribute specific to the function.

Reference numeral 803 denotes an attribute representing a function group to which the function belongs. The function group consists of a group of functions, of which the applying sequence is freely changed and between which interference due to the change of the sequence does not occur, of all the functions held by each printer driver model.

In this embodiment, functions are classified into groups each of which includes functions for a single logical page, those for a plurality of logical pages, those for a single physical page, or those for a plurality of physical pages, in accordance with the group attributes corresponding to the respective function groups to which the respective functions belong. The execution sequence of the function groups is uniquely specified.

In this embodiment, assume that functions of respective function groups are applied in the order of a function group for a single logical page, that for a plurality of logical pages, that for a single physical page, and that for a plurality of physical pages. Note that as long as a condition that functions between which interference due to the change of the order does not occur are grouped is satisfied, how to form function groups does not matter.

Reference numeral 804 denotes an attribute representing a priority code calculated for the function. The priority codes are information for specifying the execution sequence of functions of each function group. Although the priority code is calculated in the process of FIG. 7 in this embodiment, the calculation process is not limited to this. If, for example, a printer driver to be used is known, functions of the printer driver are also known. The printer driver 203 therefore may hold priority codes corresponding to the respective functions in advance.

<Print Execution Process>

A print execution process in the present invention will be described next.

First, a data flow associated with the print execution process by the print system according to the embodiment of the present invention will be explained using FIG. 9.

Figure 9:
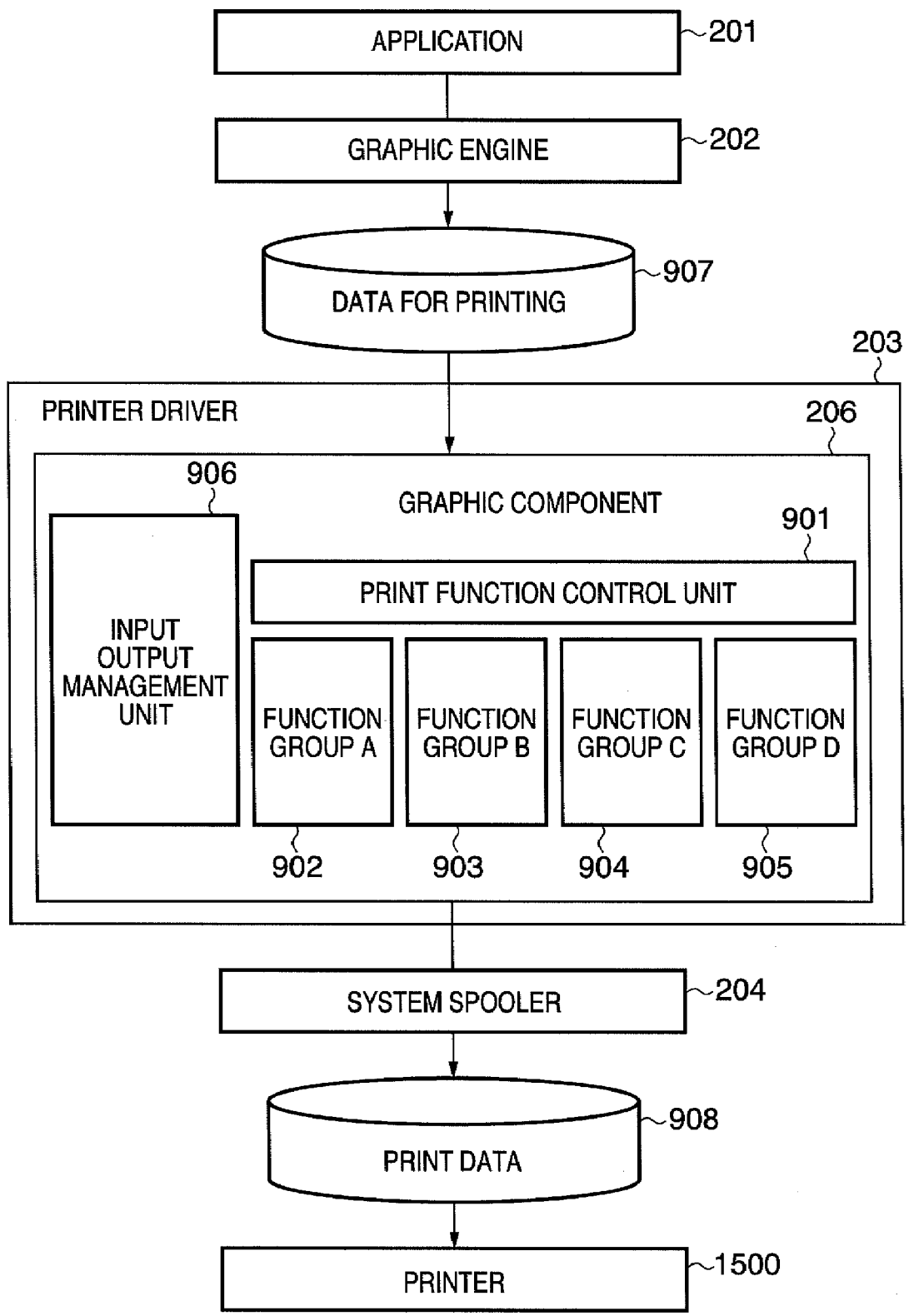
FIG. 9 is a view showing a data flow associated with a print execution process by the print system according to the embodiment of the present invention.

FIG. 9 is a view showing the data flow associated with the print execution process by the print system according to the embodiment of the present invention. FIG. 9 especially shows the detailed configuration of some of the components in FIG. 2, which are associated with the print execution process.

Reference numeral 906 denotes an input output management unit which inputs data 907 for printing from the graphic engine 202 and outputs, via the system spooler, print data 908 eventually created. Reference numeral 901 denotes a print function control unit which classifies functions acquired from the print settings into function groups 902 to 905 and controls the applying sequence.

A print execution process by the printer driver 203 will be described next using FIG. 10.

Figure 10:
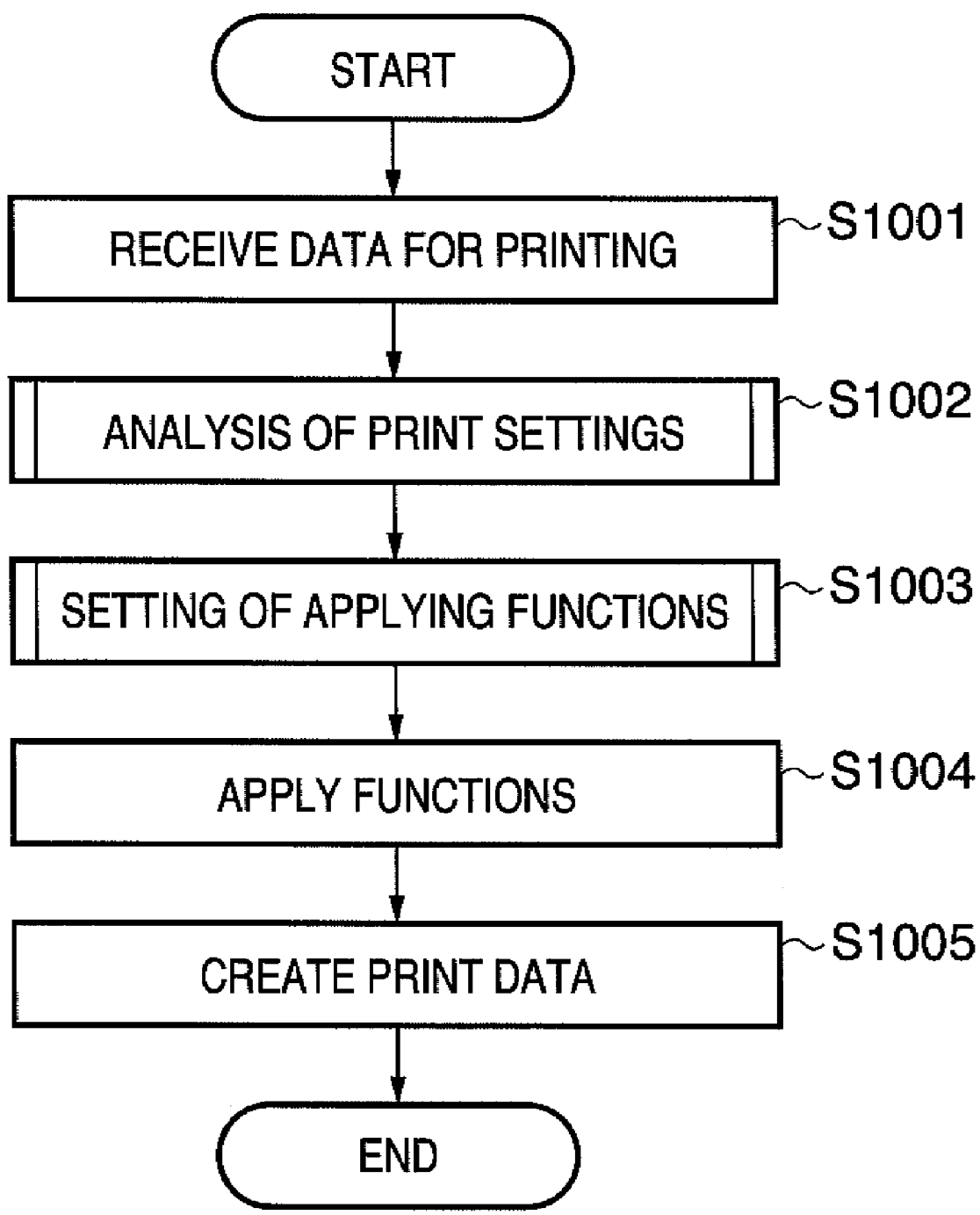
FIG. 10 is a flowchart showing a print execution process by the printer driver according to the embodiment of the present invention.

FIG. 10 is a flowchart showing the print execution process by the printer driver according to the embodiment of the present invention.

In step S1001, the input output management unit 906 acquires or receives the data 907 for printing created by the application 201 via the graphic engine 202. In step S1002, the print function control unit 901 acquires the print settings from the data 907 for printing, and analyzes them. The print function control unit 901 stores (sets) functions applicable to the data 907 for printing (applying functions) in an applicable one of the function groups 902 to 904 on the basis of the analyzed print settings in step S1003.

In this embodiment, the function group 902 (function group A) includes functions for a single logical page. The function group 903 (function group B) includes functions for a plurality of logical pages. The function group 904 (function group C) includes functions for a single physical page. The function group 905 (function group D) includes functions for a plurality of physical pages. Details of the processes in steps S1002 and S1003 will be described later using FIG. 11.

Functions to be executed in accordance with the print settings for the data 907 for printing are applied in step S1004. Details of the process in step S1004 will be explained later using FIG. 12.

In step S1005, the input output management unit 906 converts the data for printing to which the functions have been applied into a form interpretable by the printer 1500 such as a PDL form, and creates the print data 908. The input output management unit 906 transmits the print data 908 through the system spooler 204 to the printer 1500 and the process ends.

Details of the process (the process for creating the function groups in executing printing) in step S1002 will be described next using FIG. 11.

Figure 11:
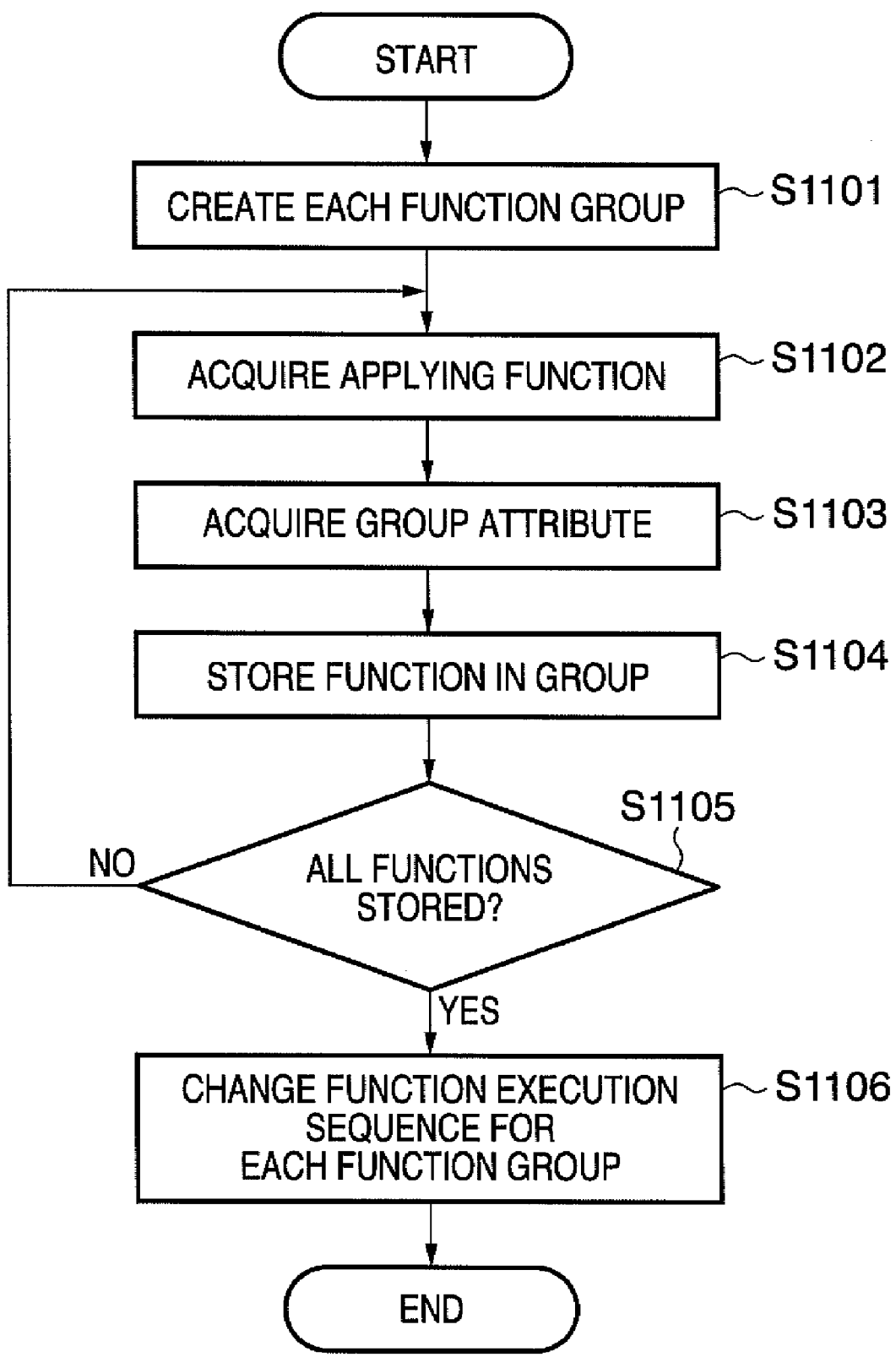
FIG. 11 is a flowchart showing details of a process in step S1002 according to the embodiment of the present invention.

FIG. 11 is a flowchart showing the details of the process in step S1002 according to the embodiment of the present invention.

The print function control unit 901 creates the function groups 902 to 904 in step S1101. In step S1102, the print function control unit 901 acquires a function (applying function) supported by itself from the acquired print settings. The print function control unit 901 acquires the group attribute 803 of the acquired function in step S1103. In step S1104, the print function control unit 901 stores the acquired function in an applicable one of the function groups 902 to 904 on the basis of the group attribute 803 of the acquired function.

It is determined in step S1105 whether the storage process in the function groups is complete for all the functions which are supported by the print function control unit 901 and can be acquired from the print settings. If the storage process is not complete (NO in step S1105), the process returns to step S1102; otherwise (YES in step S1105), the process advances to step S1106.

In step S1106, the print function control unit 901 changes (rearranges) the execution sequence of the functions stored in each function group on the basis of the priority codes 804.

Details of the process (the process for applying the functions) in step S1003 will be described next using FIG. 12.

Figure 12:
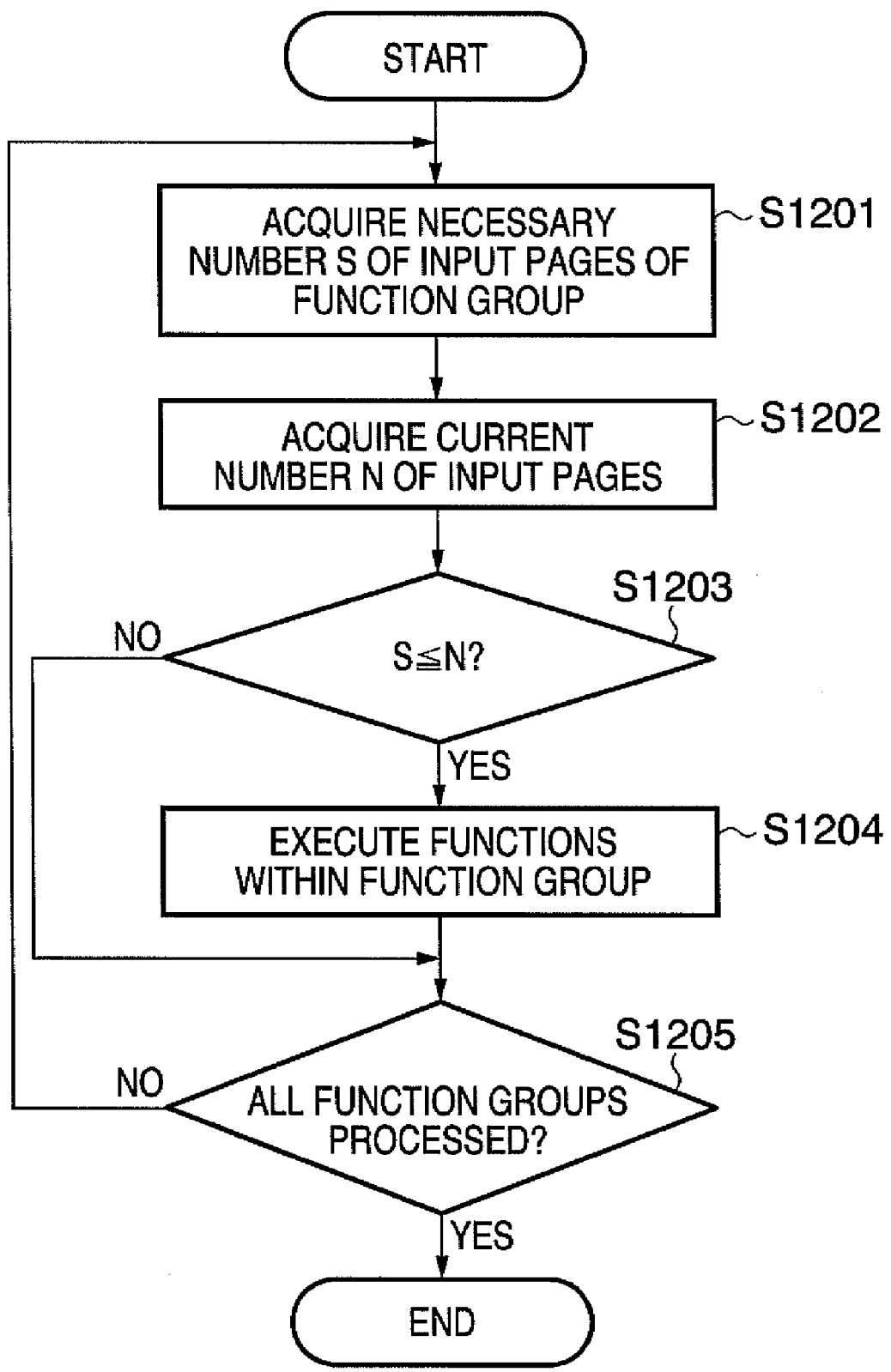
FIG. 12 is a flowchart showing details of a process in step S1003 according to the embodiment of the present invention.

FIG. 12 is a flowchart showing the details of the process in step S1003 according to the embodiment of the present invention.

In step S1201, the print function control unit 901 queries the current execution target function group (any one of the function groups 902 to 904), and acquires the number S of input pages which can be obtained from the data 907 for printing. In step S1202, the print function control unit 901 acquires the number N of input pages of the execution target function group held by the print function control unit 901.

In step S1203, the print function control unit 901 compares S with N, and determines whether N is equal to or more than S. If N is equal to or more than S (YES in step S1203), the process advances to step S1204; otherwise (NO in step S1203), the process advances to step S1205.

In step S1204, the print function control unit 901 applies and executes the functions stored in the target function group to processing target page data of the data 907 for printing, in the order of priority codes.

It is determined in step S1205 whether the application of the functions of all the function groups to the print data is complete. If the application is not complete (NO in step S1205), the process returns to step S1201; otherwise (YES in step S1205), the process ends.

The process is executed every time the page data is acquired from the data for printing. Along with this process, a process for the function to be applied is executed as a job finishing process, when the final page data is acquired.

<Differences Between Output Results Due to Classification of Print Functions and Execution Sequence>

Figure 13:
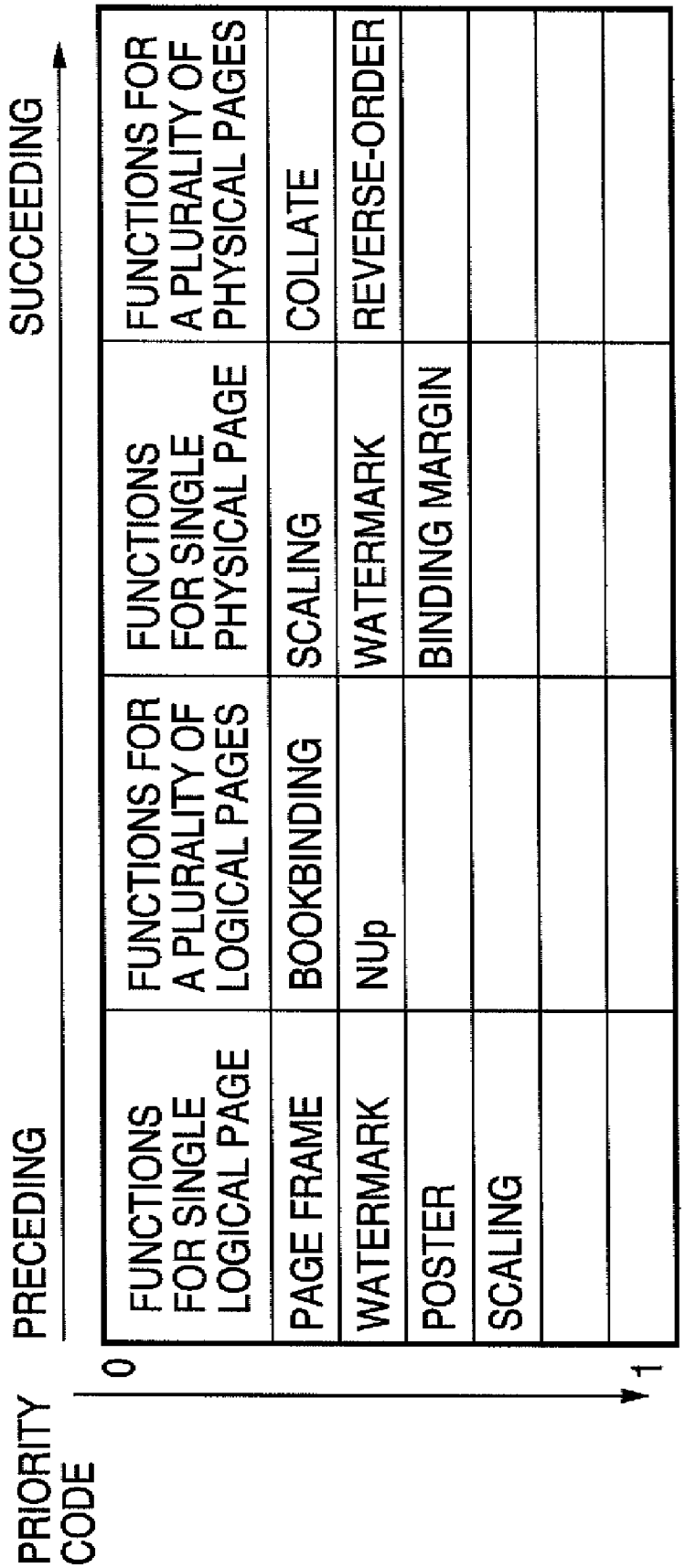
FIG. 13 is a view showing a classification example of the functions according to the embodiment of the present invention.

FIG. 13 is a view showing a classification example of the functions according to the embodiment of the present invention.

To prevent occurrence of interference due to change of the applying sequence of the functions, an attribute of a function application target page is considered for a classification method. In this embodiment, assume that the attribute of the target page represents a logical or physical page. That is, a function group for each group of functions, between which contradiction due to the change of the execution sequence does not arise, of those executable in the printer is created for each page attribute serving as a processing unit of the print data to apply the functions in the embodiment.

The logical page indicates a page logically created by the application. The physical page indicates a page represented by the same coordinate as that of a physical sheet which is finally output as a print result by the printer on the basis of the logical page created by the application.

In this embodiment, functions for logical pages and those for physical pages are classified as different functions in consideration of a condition that the functions for logical pages must exist (must be processed) prior to those for physical pages.

In this embodiment, according to the number of input pages acquired from the data for printing, the functions for logical pages and those for physical pages are also classified into functions for a single page and those for a plurality of pages, respectively. The purpose of this classification is to increase the performance in executing functions. These functions may be further classified and then function groups may be created in accordance with the necessary number of input pages.

FIG. 13 is a view showing a classification example of the functions when the functions are classified into groups each of which includes functions for a single logical page, those for a plurality of logical pages, those for a single physical page, or those for a plurality of physical pages. The functions for a single logical page are page frame, watermark, poster, and scaling functions. The functions for a plurality of logical pages are bookbinding print and NUp functions. The functions for a single physical page are scaling, watermark, and binding margin functions. The functions for a plurality of physical pages are collate print and reverse-order print functions.

This classification is specific to each printer driver. Print setting is made in accordance with the classification and print settings are created. Printing is executed on the basis of the created print settings.

FIGS. 14A to 14D are views showing examples of differences between output results obtained by changing the applying sequence of the functions in executing printing according to the embodiment of the present invention.

Referring to FIG. 14A, the watermark function and the reduction of the scaling function are selected from the functions for a single logical page. The priority codes are set so as to execute the watermark and reduction functions in the order named. The NUp function is selected as a function for a plurality of logical pages.

Referring to FIG. 14B, the watermark function and the reduction of the scaling function are selected from the functions for a single logical page. The priority codes are set so as to execute the reduction and watermark functions in the order named. The NUp function is selected as a function for a plurality of logical pages.

Referring to FIG. 14C, the Nup function is selected as the function for a plurality of logical pages. The watermark function and the reduction of the scaling function are selected from the functions for a single physical page. The priority codes are set so as to execute the reduction and watermark functions in the order named.

Referring to FIG. 14D, the Nup function is selected as a function for a plurality of logical pages. The watermark function and the reduction of the scaling function are selected from the functions for a single physical page. The priority codes are set so as to execute the watermark and reduction functions in the order named.

The user can readily control the function sequence and obtain the intended output results in consideration of the output results shown in FIGS. 14A to 14D.

As described above, according to the embodiment, when the user sets a specific set of print settings in combination upon print setting, the user can readily set the execution sequence without considering any contradiction due to the sequence of functions to be executed in accordance with the print settings. The user therefore can obtain the intended print results.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-098682 filed on Apr. 4, 2007, which is hereby incorporated by reference herein in its entirety.

What is claimed is:

1. An information processing apparatus which generates print data to be output to a printer, comprising:
    acquisition means for acquiring print settings for input data for printing;
    creation means for creating a function group for each group of functions, between which contradiction due to change of an execution sequence does not arise, of those executable in the printer;
    setting means for setting, for each function group created by said creation means, an execution sequence of a group of functions belonging to the function group;
    applying means for applying processes for functions designated by the print settings acquired by said acquisition means to the data for printing in accordance with the execution sequence set for said each function group by said setting means;
    output means for outputting, to the printer, print data created by applying the processes by said applying means; and
    warning information output means for outputting warning information representing that identical functions are designated between different function groups by the print settings.

2. The apparatus according to claim 1, wherein said creation means creates a function group for each group of functions, between which contradiction due to change of an execution sequence does not arise, of those executable in the printer, for each page attribute serving as a processing unit of the data for printing to apply the functions.

3. The apparatus according to claim 2, wherein the page attribute is information representing whether the processing unit of the print data is made up from a single page or a plurality of pages.

4. An information processing apparatus which generates print data to be output to a printer, comprising:
    acquisition means for acquiring print settings for input data for printing;
    creation means for creating a function group for each group of functions, between which contradiction due to change of an execution sequence does not arise, of those executable in the printer;
    setting means for setting, for each function group created by said creation means, an execution sequence of a group of functions belonging to the function group;
    applying means for applying processes for functions designated by the print settings acquired by said acquisition means to the data for printing in accordance with the execution sequence set for said each function group by said setting means; and
    output means for outputting, to the printer, print data created by applying the processes by said applying means;
    wherein said setting means includes:
    calculation means for calculating priority for each of the functions on the basis of an arrangement sequence of the group of functions within the function group and the number of functions selected in accordance with the print settings within the function group, and
    change means for changing the execution sequence on the basis of the priority calculated by said calculation means.

5. A control method for an information processing apparatus which generates print data to be output to a printer, comprising the steps of:
    acquiring, by acquisition means, print settings for input data for printing;
    creating, by creation means, a function group for each group of functions, between which contradiction due to change of an execution sequence does not arise, of those executable in the printer;

setting, by setting means, an execution sequence of a group of functions belonging to the function group, for each function group created in the creating step;

applying, by applying means, processes for functions designated by the print settings acquired in the acquiring step to the data for printing in accordance with the execution sequence set for said each function group in the setting step;

outputting, to the printer by output means, print data created by applying the processes in the applying step; and outputting warning information representing that identical functions are designated between different function groups by the print settings.

6. A computer program stored in a non-transitory computer-readable medium for causing a computer to execute control of an information processing apparatus which generates print data to be output to a printer, causing the computer to execute the steps of:

acquiring, by acquisition means, print settings for input data for printing;

creating, by creation means, a function group for each group of functions, between which contradiction due to change of an execution sequence does not arise, of those executable in the printer;

setting, by setting means, an execution sequence of a group of functions belonging to the function group on the basis of priority of each of the functions, for each function group created in the creating step;

applying, by applying means, processes for functions designated by the print settings acquired in the acquiring step to the data for printing in accordance with the execution sequence set for said each function group in the setting step;

outputting, to the printer by output means, print data created by applying the processes in the applying step; and outputting warning information representing that identical functions are designated between different function groups by the print settings.

7. A control method for an information processing apparatus which generates print data to be output to a printer, comprising the steps of:

acquiring, by acquisition means, print settings for input data for printing;

creating, by creation means, a function group for each group of functions, between which contradiction due to change of an execution sequence does not arise, of those executable in the printer;

setting, by setting means, an execution sequence of a group of functions belonging to the function group, for each function group created in the creating step;

applying, by applying means, processes for functions designated by the print settings acquired in the acquiring step to the data for printing in accordance with the execution sequence set for said each function group in the setting step; and outputting, to the printer by output means, print data created by applying the processes in the applying step;

wherein said setting step includes:

calculating priority for each of the functions on the basis of an arrangement sequence of the group of functions within the function group and the number of functions selected in accordance with the print settings within the function group, and changing the execution sequence on the basis of the priority calculated in said calculating step.

8. A computer program stored in a non-transitory computer-readable medium for causing a computer to execute control of an information processing apparatus which generates print data to be output to a printer, causing the computer to execute the steps of:

acquiring, by acquisition means, print settings for input data for printing;

creating, by creation means, a function group for each group of functions, between which contradiction due to change of an execution sequence does not arise, of those executable in the printer;

setting, by setting means, an execution sequence of a group of functions belonging to the function group on the basis of priority of each of the functions, for each function group created in the creating step;

applying, by applying means, processes for functions designated by the print settings acquired in the acquiring step to the data for printing in accordance with the execution sequence set for said each function group in the setting step; and outputting, to the printer by output means, print data created by applying the processes in the applying step, wherein said setting step includes:

calculating priority for each of the functions on the basis of an arrangement sequence of the group of functions within the function group and the number of functions selected, in accordance with the print settings within the function group, and changing the execution sequence on the basis of the priority calculated in said calculating step.

* * * * *